United States Patent
Lee et al.

(10) Patent No.: US 11,889,520 B2
(45) Date of Patent: Jan. 30, 2024

(54) METHOD AND APPARATUS FOR TRANSMITTING OR RECEIVING SIGNAL IN WIRELESS COMMUNICATION SYSTEM

(71) Applicant: LG Electronics Inc., Seoul (KR)

(72) Inventors: Youngdae Lee, Seoul (KR); Suckchel Yang, Seoul (KR); Seonwook Kim, Seoul (KR); Joonkui Ahn, Seoul (KR)

(73) Assignee: LG Electronics Inc., Seoul (KR)

( * ) Notice: Subject to any disclaimer, the term of this patent is extended or adjusted under 35 U.S.C. 154(b) by 172 days.

(21) Appl. No.: 17/396,139

(22) Filed: Aug. 6, 2021

(65) Prior Publication Data

US 2022/0046689 A1 Feb. 10, 2022

Related U.S. Application Data

(60) Provisional application No. 63/062,413, filed on Aug. 6, 2020.

(51) Int. Cl.
*H04W 72/12* (2023.01)
*H04W 72/23* (2023.01)
*H04L 1/1829* (2023.01)
*H04W 72/30* (2023.01)

(52) U.S. Cl.
CPC .......... *H04W 72/23* (2023.01); *H04L 1/1864* (2013.01); *H04W 72/30* (2023.01)

(58) Field of Classification Search
CPC .... H04W 72/23; H04W 72/30; H04L 1/1864; H04L 5/0053; H04L 5/0055; H04L 5/0092; H04L 1/1861; H04L 2001/0093
See application file for complete search history.

(56) References Cited

U.S. PATENT DOCUMENTS

| | | | | |
|---|---|---|---|---|
| 2017/0353273 A1* | 12/2017 | Zhang | ................... | H04L 1/1671 |
| 2020/0396760 A1* | 12/2020 | Yi | ................... | H04L 1/1864 |
| 2021/0029513 A1* | 1/2021 | Rico Alvarino | .... | H04W 72/121 |
| 2022/0061078 A1* | 2/2022 | Guan | ................... | H04L 1/1861 |
| 2022/0123822 A1* | 4/2022 | Shi | ................... | H04B 7/088 |
| 2023/0047407 A1* | 2/2023 | Li | ................... | H04B 7/0639 |
| 2023/0050170 A1* | 2/2023 | Wang | ................... | H04L 1/1685 |

\* cited by examiner

*Primary Examiner* — John D Blanton
(74) *Attorney, Agent, or Firm* — Fish & Richardson P.C.

(57) ABSTRACT

Disclosed herein is a terminal configured to acquire a configuration for at least one PUCCH resource set associated with at least one downlink multicast channel, monitor a PDCCH in a search space for scheduling of a specific downlink multicast channel, and detect, as a result of the monitoring of the PDCCH, DCI having a CRC scrambled with a specific G-RNTI, wherein a specific PUCCH resource set associated with the specific downlink multicast channel may be mapped to a specific downlink frequency band having the search space for the monitoring of the PDCCH, wherein a PUCCH resource for transmission of HARQ-ACK for the specific downlink multicast channel among one or more PUCCH resources included in the specific PUCCH resource set may be indicated through the DCI.

14 Claims, 11 Drawing Sheets

Non - interleaved CCE - to - REG mapping

METHOD AND APPARATUS FOR TRANSMITTING OR RECEIVING SIGNAL IN WIRELESS COMMUNICATION SYSTEM

CROSS-REFERENCE TO RELATED APPLICATIONS

This application claims the benefit of U.S. Provisional Application No. 63/062,413, filed on Aug. 6, 2020, which is hereby incorporated by reference as if fully set forth herein.

TECHNICAL FIELD

The present disclosure relates to a wireless communication system, and more particularly, to a method and apparatus for transmitting/receiving a wireless signal.

BACKGROUND

Generally, a wireless communication system is developing to diversely cover a wide range to provide such a communication service as an audio communication service, a data communication service and the like. The wireless communication is a sort of a multiple access system capable of supporting communications with multiple users by sharing available system resources (e.g., bandwidth, transmit power, etc.). For example, the multiple access system may be any of a code division multiple access (CDMA) system, a frequency division multiple access (FDMA) system, a time division multiple access (TDMA) system, an orthogonal frequency division multiple access (OFDMA) system, and a single carrier frequency division multiple access (SC-FDMA) system.

SUMMARY

An object of the present disclosure is to provide a method of efficiently performing wireless signal transmission/reception procedures and an apparatus therefor.

It will be appreciated by persons skilled in the art that the objects that could be achieved with the present disclosure are not limited to what has been particularly described hereinabove and the above and other objects that the present disclosure could achieve will be more clearly understood from the following detailed description.

In one aspect of the present disclosure, a method for method for receiving a signal by a terminal in a wireless communication system may include acquiring a configuration for at least one physical uplink control channel (PUCCH) resource set associated with at least one downlink multicast channel, monitoring a physical downlink control channel (PDCCH) in a search space for scheduling of a specific downlink multicast channel among the at least one downlink multicast channel, and detecting, as a result of the monitoring of the PDCCH, downlink control information (DCI) having a cyclic redundancy check (CRC) scrambled with a specific group-radio network temporary identifier (G-RNTI). A specific PUCCH resource set associated with the specific downlink multicast channel may be mapped to a specific downlink frequency band having the search space for the monitoring of the PDCCH. A PUCCH resource for transmission of hybrid automatic repeat request (HARQ)-acknowledgement (ACK) for the specific downlink multicast channel among one or more PUCCH resources included in the specific PUCCH resource set may be indicated through the DCI.

The PUCCH resource for the transmission of the HARQ-ACK may be indicated through a PUCCH resource indicator included in the DCI.

The at least one PUCCH resource set associated with the at least one downlink multicast channel may be configured separately from a PUCCH resource set associated with a downlink unicast channel.

The specific PUCCH resource set may be mapped to one or more G-RNTIs including the specific G-RNTI.

Transmitting the HARQ-ACK through the determined PUCCH resource may not be allowed when a timer for uplink timing of the terminal expires.

The terminal may transmit the HARQ-ACK through the determined PUCCH resource on a basis that a timer for the uplink timing has not expired.

The specific downlink frequency band may be related to an active bandwidth part (BWP) of the terminal.

The specific downlink frequency band may correspond to a terminal-common frequency resource.

The specific downlink multicast channel may be a multicast traffic channel carrying multicast data.

In another aspect of the present disclosure, a computer-readable recording medium having a program recorded thereon for executing the signal reception method described above may be provided.

In another aspect of the present disclosure, a terminal for carrying out the above-described signal reception method may be provided.

In another aspect of the present disclosure, a device for controlling the terminal for carrying out the above-described signal reception method may be provided.

In another aspect of the present disclosure, a method for transmitting a signal by a base station in a wireless communication system may include configuring at least one physical uplink control channel (PUCCH) resource set associated with at least one downlink multicast channel, generating downlink control information (DCI) having a cyclic redundancy check (CRC) scrambled with a specific group-radio network temporary identifier (G-RNTI), and transmitting a physical downlink control channel (PDCCH) carrying the DCI in a search space for scheduling of a specific downlink multicast channel among the at least one downlink multicast channel.

A specific PUCCH resource set associated with the specific downlink multicast channel may be mapped to a specific downlink frequency band having the search space for the transmitting of the PDCCH. A PUCCH resource for reception of hybrid automatic repeat request (HARQ)-acknowledgement (ACK) for the specific downlink multicast channel among one or more PUCCH resources included in the specific PUCCH resource set may be indicated through the DCI.

In another aspect of the present disclosure, a base station for carrying out the signal transmission method described above may be provided.

According to an embodiment of the present disclosure, a PUCCH resource set for HARQ-ACK feedback for multicast transmission may be configured/indicated separately from unicast transmission. Accordingly, multicast transmission and HARQ-ACK feedback may be carried out more efficiently and reliably.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

DETAILED DESCRIPTION

Figure 1:
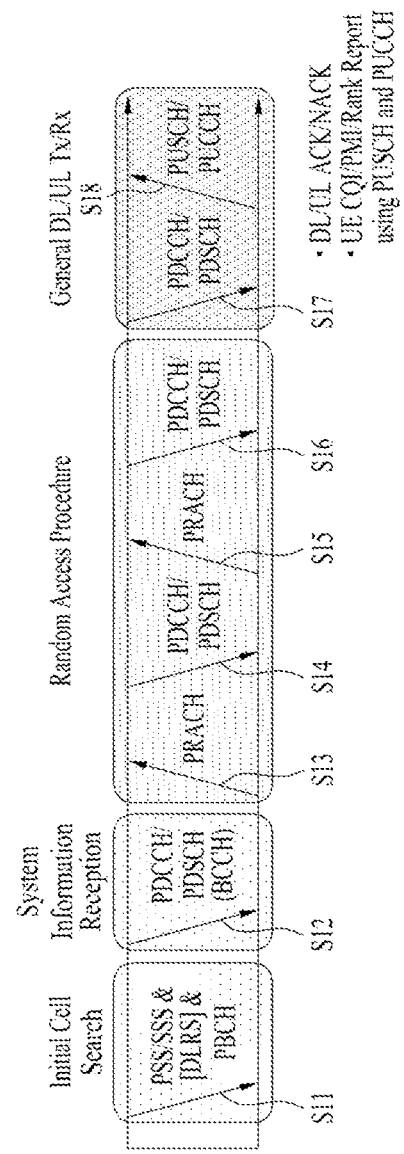
FIG. 1 illustrates physical channels used in a 3rd generation partnership project (3GPP) system, which is an example of wireless communication systems, and a general signal transmission method using the same.

Embodiments of the present disclosure are applicable to a variety of wireless access technologies such as code division multiple access (CDMA), frequency division multiple access (FDMA), time division multiple access (TDMA), orthogonal frequency division multiple access (OFDMA), and single carrier frequency division multiple access (SC-FDMA). CDMA can be implemented as a radio technology such as Universal Terrestrial Radio Access (UTRA) or CDMA2000. TDMA can be implemented as a radio technology such as Global System for Mobile communications (GSM)/General Packet Radio Service (GPRS)/Enhanced Data Rates for GSM Evolution (EDGE). OFDMA can be implemented as a radio technology such as Institute of Electrical and Electronics Engineers (IEEE) 802.11 (Wireless Fidelity (Wi-Fi)), IEEE 802.16 (Worldwide interoperability for Microwave Access (WiMAX)), IEEE 802.20, and Evolved UTRA (E-UTRA). UTRA is a part of Universal Mobile Telecommunications System (UMTS). 3rd Generation Partnership Project (3GPP) Long Term Evolution (LTE) is part of Evolved UMTS (E-UMTS) using E-UTRA, and LTE-Advanced (A) is an evolved version of 3GPP LTE. 3GPP NR (New Radio or New Radio Access Technology) is an evolved version of 3GPP LTE/LTE-A.

As more and more communication devices require a larger communication capacity, there is a need for mobile broadband communication enhanced over conventional radio access technology (RAT). In addition, massive Machine Type Communications (MTC) capable of providing a variety of services anywhere and anytime by connecting multiple devices and objects is another important issue to be considered for next generation communications. Communication system design considering services/UEs sensitive to reliability and latency is also under discussion. As such, introduction of new radio access technology considering enhanced mobile broadband communication (eMBB), massive MTC, and Ultra-Reliable and Low Latency Communication (URLLC) is being discussed. In the present disclosure, for simplicity, this technology will be referred to as NR (New Radio or New RAT).

For the sake of clarity, 3GPP NR is mainly described, but the technical idea of the present disclosure is not limited thereto.

Details of the background, terminology, abbreviations, etc. used herein may be found in 3GPP standard documents published before the present disclosure.

Following documents are incorporated by reference:
3GPP LTE
TS 36.211: Physical channels and modulation
TS 36.212: Multiplexing and channel coding
TS 36.213: Physical layer procedures
TS 36.300: Overall description
TS 36.321: Medium Access Control (MAC)
TS 36.331: Radio Resource Control (RRC)
3GPP NR
TS 38.211: Physical channels and modulation
TS 38.212: Multiplexing and channel coding
TS 38.213: Physical layer procedures for control
TS 38.214: Physical layer procedures for data
TS 38.300: NR and NG-RAN Overall Description
TS 38.321: Medium Access Control (MAC)
TS 38.331: Radio Resource Control (RRC) protocol specification Abbreviations and Terms PDCCH: Physical Downlink Control CHannel
PDSCH: Physical Downlink Shared CHannel
PUSCH: Physical Uplink Shared CHannel
CSI: Channel state information
RRM: Radio resource management
RLM: Radio link monitoring
DCI: Downlink Control Information
CAP: Channel Access Procedure
Ucell: Unlicensed cell
PCell: Primary Cell
PSCell: Primary SCG Cell
TBS: Transport Block Size
SLIV: Starting and Length Indicator Value
BWP: BandWidth Part
CORESET: COntrol REsourse SET
REG: Resource element group
SFI: Slot Format Indicator
COT: Channel occupancy time
SPS: Semi-persistent scheduling
PLMN ID: Public Land Mobile Network identifier
RACH: Random Access Channel
RAR: Random Access Response
MBMS: Multimedia Broadcast/Multicast Service
Msg3: Message transmitted on UL-SCH containing a C-RNTI MAC CE or CCCH SDU, submitted from upper layer and associated with the UE Contention Resolution Identity, as part of a Random Access procedure.
Special Cell: For Dual Connectivity operation the term Special Cell refers to the PCell of the MCG or the PSCell of the SCG depending on if the MAC entity is associated to the MCG or the SCQ respectively. Otherwise the term Special Cell refers to the PCell. A Special Cell supports PUCCH transmission and contention-based Random Access, and is always activated.
Serving Cell: A PCell, a PSCell, or an SCell
MBSFN Synchronization Area: (in case of LTE) an area of the network where all eNodeBs can be synchronized and perform MBSFN transmissions. MBSFN Synchronization Areas are capable of supporting one or more MBSFN Areas. On a given frequency layer, eNodeB can only belong to one MBSFN Synchronization Area. MBSFN Synchronization Areas are independent from the definition of MBMS Service Areas.

MBSFN Transmission or a transmission in MBSFN mode: a simultaneous broadcast scheme performed by transmitting the same waveforms at the same time from multiple cells. An MBSFN Transmission from multiple cells within the MBSFN Area is seen as a single transmission by a UE.

MBSFN Area: an MBSFN Area consists of a group of cells within an MBSFN Synchronization Area of a network, which are co-ordinated to achieve an MBSFN Transmission. Except for the MBSFN Area Reserved Cells, all cells within an MBSFN Area contribute to the MBSFN Transmission and advertise its availability. The UE may only need to consider a subset of the configured MBSFN area (i.e., service(s) in interest).

In a wireless communication system, a user equipment (UE) receives information through downlink (DL) from a base station (BS) and transmit information to the BS through uplink (UL). The information transmitted and received by the BS and the UE includes data and various control information and includes various physical channels according to type/usage of the information transmitted and received by the UE and the BS.

FIG. 1 illustrates physical channels used in a 3GPP NR system and a general signal transmission method using the same.

When a UE is powered on again from a power-off state or enters a new cell, the UE performs an initial cell search procedure, such as establishment of synchronization with a BS, in step S101. To this end, the UE receives a synchronization signal block (SSB) from the BS. The SSB includes a primary synchronization signal (PSS), a secondary synchronization signal (SSS), and a physical broadcast channel (PBCH). The UE establishes synchronization with the BS based on the PSS/SSS and acquires information such as a cell identity (ID). The UE may acquire broadcast information in a cell based on the PBCH. The UE may receive a DL reference signal (RS) in an initial cell search procedure to monitor a DL channel status.

After initial cell search, the UE may acquire more specific system information by receiving a physical downlink control channel (PDCCH) and receiving a physical downlink shared channel (PDSCH) based on information of the PDCCH in step S102.

The UE may perform a random access procedure to access the BS in steps S103 to S106. For random access, the UE may transmit a preamble to the BS on a physical random access channel (PRACH) (S103) and receive a response message for preamble on a PDCCH and a PDSCH corresponding to the PDCCH (S104). In the case of contention-based random access, the UE may perform a contention resolution procedure by further transmitting the PRACH (S105) and receiving a PDCCH and a PDSCH corresponding to the PDCCH (S106).

After the foregoing procedure, the UE may receive a PDCCH/PDSCH (S107) and transmit a physical uplink shared channel (PUSCH)/physical uplink control channel (PUCCH) (S108), as a general downlink/uplink signal transmission procedure. Control information transmitted from the UE to the BS is referred to as uplink control information (UCI). The UCI includes hybrid automatic repeat and request acknowledgement/negative-acknowledgement (HARQ-ACK/NACK), scheduling request (SR), channel state information (CSI), etc. The CSI includes a channel quality indicator (CQI), a precoding matrix indicator (PMI), a rank indicator (RI), etc. While the UCI is transmitted on a PUCCH in general, the UCI may be transmitted on a PUSCH when control information and traffic data need to be simultaneously transmitted. In addition, the UCI may be aperiodically transmitted through a PUSCH according to request/command of a network.

Figure 2:
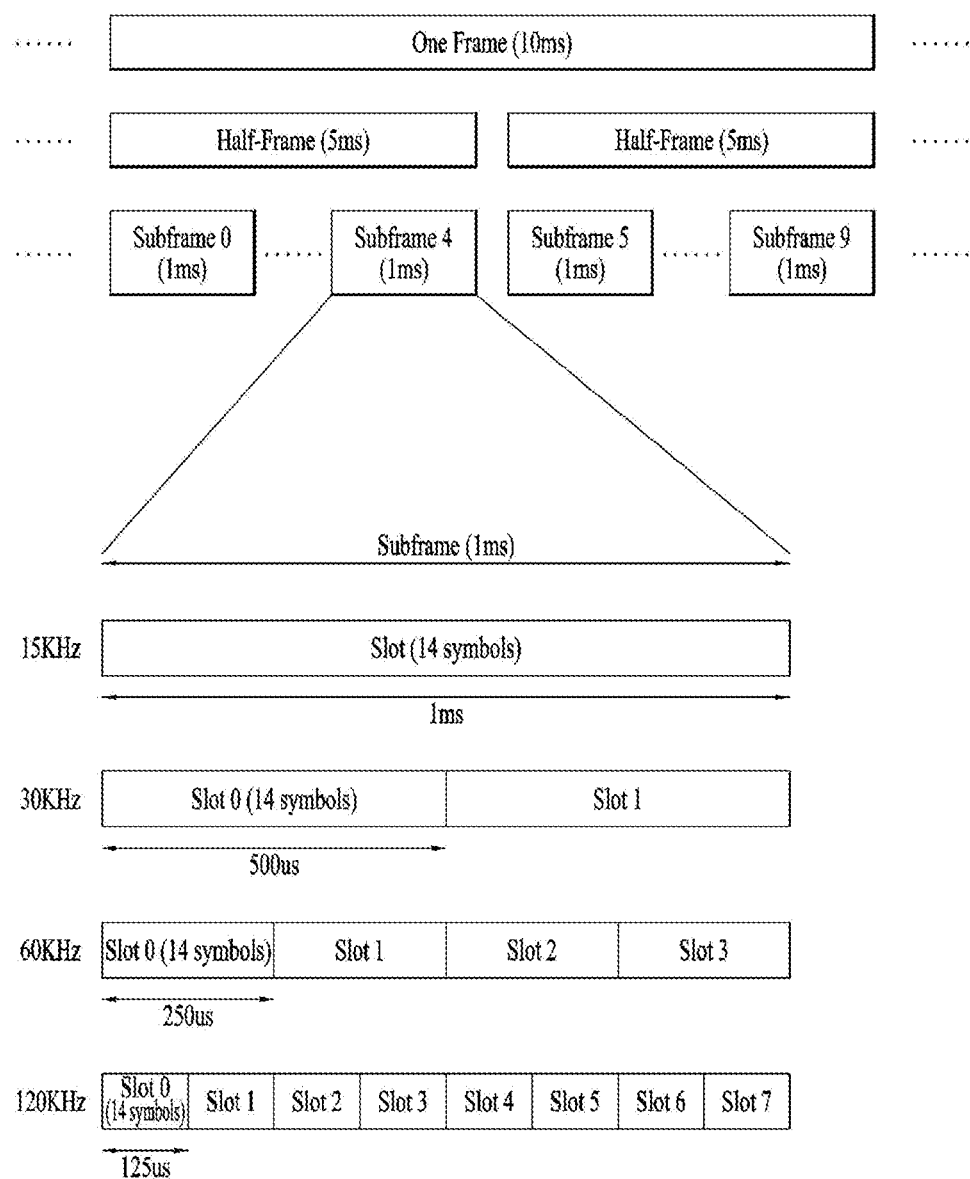
FIG. 2 illustrates a radio frame structure.

FIG. 2 illustrates a radio frame structure. In NR, uplink and downlink transmissions are configured with frames. Each radio frame has a length of 10 ms and is divided into two 5-ms half-frames (1F). Each half-frame is divided into five 1-ms subframes (SFs). A subframe is divided into one or more slots, and the number of slots in a subframe depends on subcarrier spacing (SCS). Each slot includes 12 or 14 Orthogonal Frequency Division Multiplexing (OFDM) symbols according to a cyclic prefix (CP). When a normal CP is used, each slot includes 14 OFDM symbols. When an extended CP is used, each slot includes 12 OFDM symbols.

Table 1 exemplarily shows that the number of symbols per slot, the number of slots per frame, and the number of slots per subframe vary according to the SCS when the normal CP is used.

TABLE 1

| SCS (15 * $2^u$) | $N^{slot}_{symb}$ | $N^{frame,u}_{slot}$ | $N^{subframe,u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

*$N^{slot}_{symb}$: Number of symbols in a slot
*$N^{frame,u}_{slot}$: Number of slots in a frame
*$N^{subframe,u}_{slot}$: Number of slots in a subframe Table 2 illustrates that the number of symbols per slot, the number of slots per frame, and the number of slots per subframe vary according to the SCS when the extended CP is used.

TABLE 2

| SCS (15 * $2^u$) | $N^{slot}_{symb}$ | $N^{frame,u}_{slot}$ | $N^{subframe,u}_{slot}$ |
|---|---|---|---|
| 60 KHz (u = 2) | 12 | 40 | 4 |

The structure of the frame is merely an example. The number of subframes, the number of slots, and the number of symbols in a frame may vary.

In the NR system, OFDM numerology (e.g., SCS) may be configured differently for a plurality of cells aggregated for one UE. Accordingly, the (absolute time) duration of a time resource (e.g., an SF, a slot or a TTI) (for simplicity, referred to as a time unit (TU)) consisting of the same number of symbols may be configured differently among the aggregated cells. Here, the symbols may include an OFDM symbol (or a CP-OFDM symbol) and an SC-FDMA symbol (or a discrete Fourier transform-spread-OFDM (DFT-s-OFDM) symbol).

Figure 3:
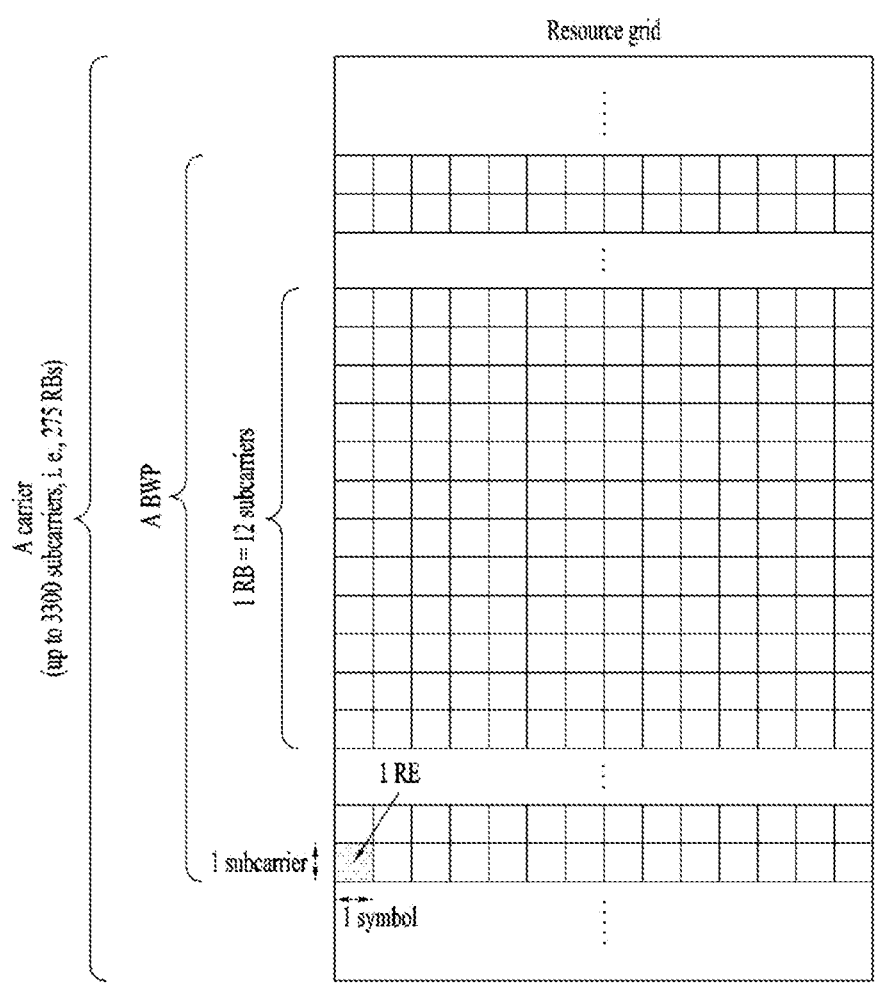
FIG. 3 illustrates a resource grid of a slot.

FIG. 3 illustrates a resource grid of a slot. A slot includes a plurality of symbols in the time domain. For example, when the normal CP is used, the slot includes 14 symbols. However, when the extended CP is used, the slot includes 12 symbols. A carrier includes a plurality of subcarriers in the frequency domain. A resource block (RB) is defined as a plurality of consecutive subcarriers (e.g., 12 consecutive subcarriers) in the frequency domain. A bandwidth part (BWP) may be defined to be a plurality of consecutive physical RBs (PRBs) in the frequency domain and correspond to a single numerology (e.g., SCS, CP length, etc.). The carrier may include up to N (e.g., 5) BWPs. Data communication may be performed through an activated BWP, and only one BWP may be activated for one UE. In the resource grid, each element is referred to as a resource element (RE), and one complex symbol may be mapped to each RE.

Figure 4:
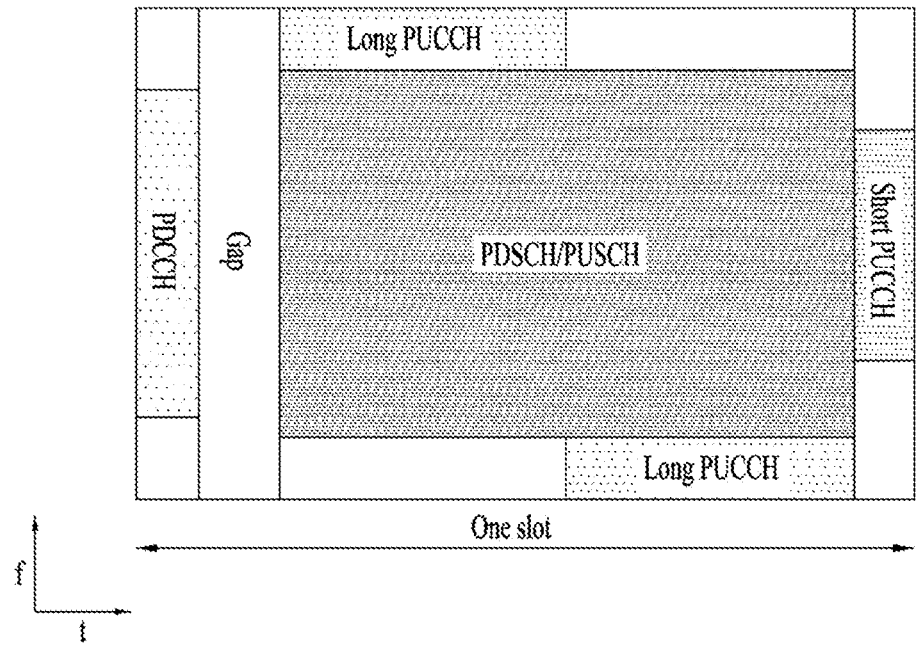
FIG. 4 illustrates exemplary mapping of physical channels in a slot.

FIG. 4 illustrates exemplary mapping of physical channels in a slot. In the NR system, a frame is characterized by a self-contained structure in which all of a DL control channel, DL or UL data, and a UL control channel may be included in one slot. For example, the first N symbols (hereinafter, referred to as a DL control region) of a slot may be used to transmit a DL control channel (e.g., PDCCH), and the last M symbols (hereinafter, referred to as a UL control region) of the slot may be used to transmit a UL control channel (e.g., PUCCH). Each of N and M is an integer equal to or larger than 0. A resource region (hereinafter, referred to as a data region) between the DL control region and the UL control region may be used to transmit DL data (e.g., PDSCH) or UL data (e.g., PUSCH). A guard period (GP) provides a time gap for transmission mode-to-reception mode switching or reception mode-to-transmission mode switching at a BS and a UE. Some symbol at the time of DL-to-UL switching in a subframe may be configured as a GP.

The PDCCH delivers DCI. For example, the PDCCH (i.e., DCI) may carry information about a transport format and resource allocation of a DL shared channel (DL-SCH), resource allocation information of an uplink shared channel (UL-SCH), paging information on a paging channel (PCH), system information on the DL-SCH, information on resource allocation of a higher-layer control message such as an RAR transmitted on a PDSCH, a transmit power control command, information about activation/release of configured scheduling, and so on. The DCI includes a cyclic redundancy check (CRC). The CRC is masked with various identifiers (IDs) (e.g. a radio network temporary identifier (RNTI)) according to an owner or usage of the PDCCH. For example, if the PDCCH is for a specific UE, the CRC is masked by a UE ID (e.g., cell-RNTI (C-RNTI)). If the PDCCH is for a paging message, the CRC is masked by a paging-RNTI (P-RNTI). If the PDCCH is for system information (e.g., a system information block (SIB)), the CRC is masked by a system information RNTI (SI-RNTI). When the PDCCH is for an RAR, the CRC is masked by a random access-RNTI (RA-RNTI).

Figure 5:
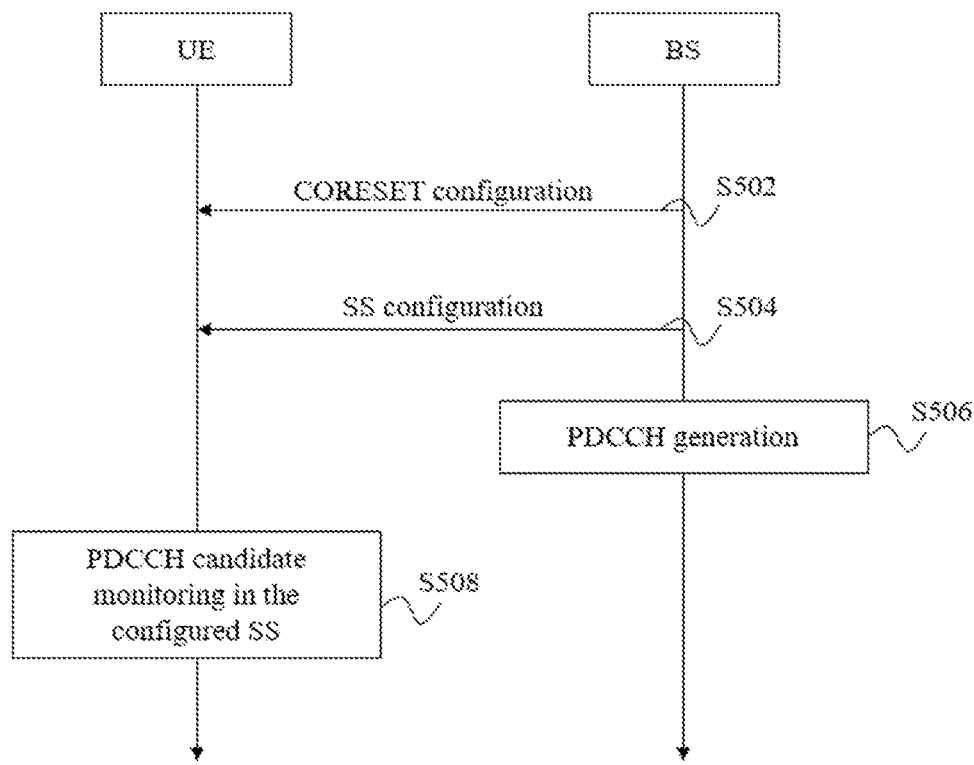
FIG. 5 is a diagram illustrating a signal flow for a physical downlink control channel (PDCCH) transmission and reception process.

FIG. 5 is a diagram illustrating a signal flow for a PDCCH transmission and reception process.

Referring to FIG. 5, a BS may transmit a control resource set (CORESET) configuration to a UE (S502). A CORSET is defined as a resource element group (REG) set having a given numerology (e.g., an SCS, a CP length, and so on). An REG is defined as one OFDM symbol by one (P)RB. A plurality of CORESETs for one UE may overlap with each other in the time/frequency domain. A CORSET may be configured by system information (e.g., a master information block (MIB)) or higher-layer signaling (e.g., radio resource control (RRC) signaling). For example, configuration information about a specific common CORSET (e.g., CORESET #0) may be transmitted in an MIB. For example, a PDSCH carrying system information block 1 (SIB1) may be scheduled by a specific PDCCH, and CORSET #0 may be used to carry the specific PDCCH. Configuration information about CORESET #N (e.g., N>0) may be transmitted by RRC signaling (e.g., cell-common RRC signaling or UE-specific RRC signaling). For example, the UE-specific RRC signaling carrying the CORSET configuration information may include various types of signaling such as an RRC setup message, an RRC reconfiguration message, and/or BWP configuration information. Specifically, a CORSET configuration may include the following information/fields.

controlResourceSetId: indicates the ID of a CORESET.

frequencyDomainResources: indicates the frequency resources of the CORESET. The frequency resources of the CORESET are indicated by a bitmap in which each bit corresponds to an RBG (e.g., six (consecutive) RBs). For example, the most significant bit (MSB) of the bitmap corresponds to a first RBG RBGs corresponding to bits set to 1 are allocated as the frequency resources of the CORESET.

duration: indicates the time resources of the CORESET. Duration indicates the number of consecutive OFDM symbols included in the CORESET. Duration has a value of 1 to 3.

cce-REG-MappingType: indicates a control channel element (CCE)-REG mapping type. Interleaved and non-interleaved types are supported.

interleaverSize: indicates an interleaver size.

pdcch-DMRS-ScramblingID: indicates a value used for PDCCH DMRS initialization.

When pdcch-DMRS-ScramblingID is not included, the physical cell ID of a serving cell is used.

precoderGranularity: indicates a precoder granularity in the frequency domain.

reg-BundleSize: indicates an REG bundle size.

tci-PresentInDCI: indicates whether a transmission configuration index (TCI) field is included in DL-related DCI.

tci-StatesPDCCH-ToAddList: indicates a subset of TCI states configured in pdcch-Config, used for providing quasi-co-location (QCL) relationships between DL RS(s) in an RS set (TCI-State) and PDCCH DMRS ports.

Further, the BS may transmit a PDCCH search space (SS) configuration to the UE (S504). The PDCCH SS configuration may be transmitted by higher-layer signaling (e.g., RRC signaling). For example, the RRC signaling may include, but not limited to, various types of signaling such as an RRC setup message, an RRC reconfiguration message, and/or BWP configuration information. While a CORESET configuration and a PDCCH SS configuration are shown in FIG. 5 as separately signaled, for convenience of description, the present disclosure is not limited thereto. For example, the CORESET configuration and the PDCCH SS configuration may be transmitted in one message (e.g., by one RRC signaling) or separately in different messages.

The PDCCH SS configuration may include information about the configuration of a PDCCH SS set. The PDCCH SS set may be defined as a set of PDCCH candidates monitored (e.g., blind-detected) by the UE. One or more SS sets may be configured for the UE. Each SS set may be a USS set or a CSS set. For convenience, PDCCH SS set may be referred to as "SS" or "PDCCH SS".

A PDCCH SS set includes PDCCH candidates. A PDCCH candidate is CCE(s) that the UE monitors to receive/detect a PDCCH. The monitoring includes blind decoding (BD) of PDCCH candidates. One PDCCH (candidate) includes 1, 2, 4, 8, or 16 CCEs according to an aggregation level (AL). One CCE includes 6 REGs. Each CORESET configuration is associated with one or more SSs, and each SS is associated with one CORESET configuration. One SS is defined based on one SS configuration, and the SS configuration may include the following information/fields.

searchSpaceId: indicates the ID of an SS.

controlResourceSetId: indicates a CORESET associated with the SS.

monitoringSlotPeriodicityAndOffset: indicates a periodicity (in slots) and offset (in slots) for PDCCH monitoring.

monitoringSymbolsWithinSlot: indicates the first OFDM symbol(s) for PDCCH monitoring in a slot configured with PDCCH monitoring. The first OFDM symbol(s) for PDCCH monitoring is indicated by a bitmap with each bit corresponding to an OFDM symbol in the slot. The MSB of the bitmap corresponds to the first OFDM symbol of the slot. OFDM symbol(s) corresponding to bit(s) set to 1 corresponds to the first symbol(s) of a CORESET in the slot.

nrofCandidates: indicates the number of PDCCH candidates (one of values 0, 1, 2, 3, 4, 5, 6, and 8) for eachALwhereAL={1, 2, 4, 8, 16}.

searchSpaceType: indicates common search space (CSS) or UE-specific search space (USS) as well as a DCI format used in the corresponding SS type.

Subsequently, the BS may generate a PDCCH and transmit the PDCCH to the UE (S506), and the UE may monitor PDCCH candidates in one or more SSs to receive/detect the PDCCH (S508). An occasion (e.g., time/frequency resources) in which the UE is to monitor PDCCH candidates is defined as a PDCCH (monitoring) occasion. One or more PDCCH (monitoring) occasions may be configured in a slot.

Table 3 shows the characteristics of each SS.

TABLE 3

| Type | Search Space | RNTI | Use Case |
|---|---|---|---|
| Type0-PDCCH | Common | SI-RNTI on a primary cell | SIB Decoding |
| Type0A-PDCCH | Common | SI-RNTI on a primary cell | SIB Decoding |
| Type1-PDCCH | Common | RA-RNTI or TC-RNTI on a primary cell | Msg2, Msg4 decoding in RACH |
| Type2-PDCCH | Common | P-RNTI on a primary cell | Paging Decoding |
| Type3-PDCCH | Common | INT-RNTI, SFI-RNTI, TPC-PUSCH-RNTI, TPC-PUCCH-RNTI, TPC-SRS-RNTI, C-RNTI, MCS-C-RNTI, or CS-RNTI(s) | |
| | UE Specific | C-RNTI, or MCS-C-RNTI, or CS-RNTI(s) | User specific PDSCH decoding |

Table 4 shows DCI formats transmitted on the PDCCH.

TABLE 4

| DCI format | Usage |
|---|---|
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

DCI format 0_0 may be used to schedule a TB-based (or TB-level) PUSCH, and DCI format 0_1 may be used to schedule a TB-based (or TB-level) PUSCH or a code block group (CBG)-based (or CBG-level) PUSCH. DCI format 1_0 may be used to schedule a TB-based (or TB-level) PDSCH, and DCI format 1_1 may be used to schedule a TB-based (or TB-level) PDSCH or a CBG-based (or CBG-level) PDSCH (DL grant DCI). DCI format 0_0/0_1 may be referred to as UL grant DCI or UL scheduling information, and DCI format 1_0/1_1 may be referred to as DL grant DCI or DL scheduling information. DCI format 2_0 is used to deliver dynamic slot format information (e.g., a dynamic slot format indicator (SFI)) to a UE, and DCI format 2_1 is used to deliver DL pre-emption information to a UE. DCI format 2_0 and/or DCI format 2_1 may be delivered to a corresponding group of UEs on a group common PDCCH which is a PDCCH directed to a group of UEs.

DCI format 0_0 and DCI format 1_0 may be referred to as fallback DCI formats, whereas DCI format 0_1 and DCI format 1_1 may be referred to as non-fallback DCI formats. In the fallback DCI formats, a DCI size/field configuration is maintained to be the same irrespective of a UE configuration. In contrast, the DCI size/field configuration varies depending on a UE configuration in the non-fallback DCI formats.

A CCE-to-REG mapping type is set to one of an interleaved type and a non-interleaved type.

Non-interleaved CCE-to-REG mapping (or localized CCE-to-REG mapping) (FIG. 5): 6 REGs for a given CCE are grouped into one REG bundle, and all of the REGs for the given CCE are contiguous. One REG bundle corresponds to one CCE.

Figure 6:
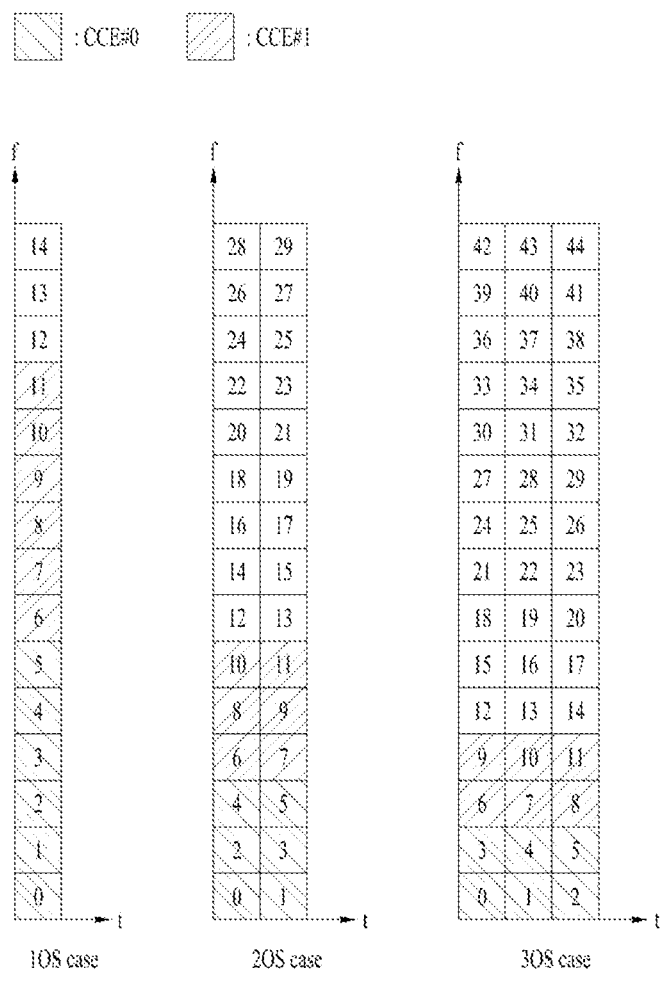
FIGS. 6 and 7 illustrate exemplary control resource set (CORESET) structures.
Figure 7:
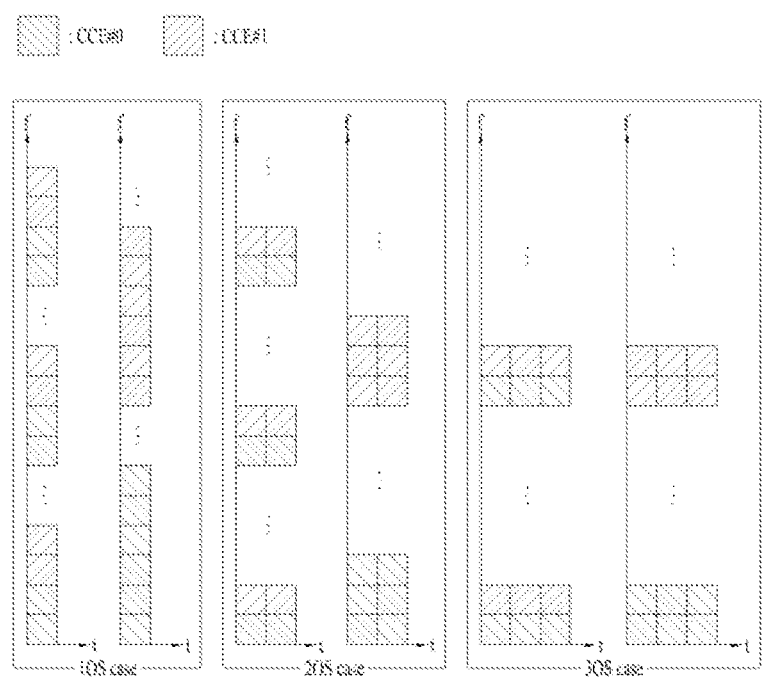

Interleaved CCE-to-REG mapping (or distributed CCE-to-REG mapping) (FIG. 6): 2, 3 or 6 REGs for a given CCE are grouped into one REG bundle, and the REG bundle is interleaved within a CORESET. In a CORESET including one or two OFDM symbols, an REG bundle includes 2 or 6 REGs, and in a CORESET including three OFDM symbols, an REG bundle includes 3 or 6 REGs. An REG bundle size is configured on a CORESET basis.

Multimedia Broadcast/Multicast Service (MBMS)

Next, the MBMS scheme of 3GPP LTE will be described. 3GPP MBMS may be divided into an SFN scheme, in which multiple BS cells are synchronized to transmit the same data on a PMCH channel, and a single cell point to multipoint (SC-PTM) scheme, in which multiple BS cells are synchronized to broadcast within a corresponding cell coverage on a PDCCH/PDSCH. The SFN scheme is used to provide a broadcast service in a wide area (e.g. MBMS area) through resources pre-allocated semi-statically, while the SC-PTM scheme is mainly used to provide a broadcast service only within a cell coverage through dynamic resources.

The SC-PTM provides one logical channel SC-MCCH (Single Cell Multicast Control Channel) and one or more logical channels SC-MTCHs (Single Cell Multicast Traffic Channels). These logical channels are mapped to a transmission channel DL-SCH and a physical channel PDSCH. The PDSCH carrying SC-MCCH or SC-MTCH data is scheduled on a PDCCH indicated by G-RNTI. In this case, a TMGI corresponding to a service ID may be mapped to a specific G-RNTI value in a one-to-one correspondence manner. Accordingly, when the BS provides a plurality of services, a plurality of G-RNTI values may be allocated for SC-PTM transmission. One or more UEs may perform PDCCH monitoring using a specific G-RNTI to receive a specific service. Here, an SC-PTM dedicated DRX on-duration period may be configured for the specific service/ specific G-RNTI. In this case, the UEs wake up only in a specific on-duration period to perform PDCCH monitoring for the G-RNTI.

Uplink Feedback Based on RACH or PUCCH for Broadcast and Multicast

The above-described configurations (3GPP system, frame structure, NR system, etc.) may be applied in combination with the methods described below according to the present disclosure, or may be supplemented to clarify the technical features of the methods proposed in the present disclosure. As used herein, "/" may mean "and," "or," or "and/or" depending on the context.

REL-17 NR intends to introduce a DL broadcast or DL multicast transmission scheme to support the MBMS service. A point-to-multipoint (PTM) transmission scheme such as MBMS enables transmission to multiple UEs with one DL broadcast/multicast to save radio resources for each UE compared to individual DL unicast transmission (e.g., point-to-point transmission).

In NR, a method by which the UE reports MBMS-related feedback (e.g., feedback of HARQ-ACK related to retransmission of MBMS data) to the BS is under discussion for reliable DL broadcast/multicast transmission. In this regard, a method allowing all idle/inactive/connected UEs to transmit MBMS-related feedback is required. For a UE in the RRC connected mode, a PUCCH resource may be configured for feedback. However, in the case of MBMS, it is difficult to always support PUCCH transmission due to UL timing or cell change, since idle/inactive UEs can also receive the feedback.

Accordingly, in the present disclosure, an uplink feedback scheme for transmission of an MBMS-related UL signal, for example, a DL broadcast/multicast transmission for reporting DL MBMS-related feedback of a UE.

Hereinafter, DL/UL BWP(s) is assumed as an example of a frequency band related to the MBMS service. However, the present disclosure is not limited to the term "BWP" and the expression of DL/UL BWP(s) may be interpreted as intended to cover various frequency sizes/resources corresponding to parts of the entire DL/UL frequency band. For example, a UE-common (BWP frequency) resource on which the MBMS service is provided may be referred to simply as a common frequency resource (CFR).

According to an embodiment of the present disclosure, a UE may operate as follows.

A UE may configure a DL BWP and a UL BWP, wherein the UE may receive a MBMS service on the DL BWP and transmit MBMS feedback on the UL BWP.
  a. The UL BWP may be one of an initial UL BWP, a default UL BWP, a configured UL BWP, an active UL BWP and an MBMS specific UL BWP.

The UE may receive configuration of one or more PUCCH resource sets

A PUCCH resource set can be mapped to/associated with the MBMS service or the DL/UL BWP. Or, a PUCCH resource set can be mapped to/associated with one of one or more G-RNTIs, one or more TMGIs including the TMGI of the MBMS service, one or more MCCH channels, and one or more MTCH channels.

The UE may monitor PDCCH on an SS set on the DL BWP.

The UE may receive a DCI with G-RNTI on PDCCH and then PDSCH transmission carrying MCCH/MTCH TB on the DL BWP for the MBMS service, wherein the DCI on the PDCCH may indicate a PUCCH resource indicator.

While a time advance timer is running (e.g., UL (Sync.) timing is maintained), the UE can transmit a PUCCH as indicated by the PUCCH resource indicator, to send MBMS feedback to the network.

If the TAT is not running or expires (i.e. UL timing is not maintained) or there is no valid PUCCH resource mapped to one of the TMGI of the MBMS service, the G-RNTI, MCCH, MTCH and the DL/UL BWP, the UE may trigger RACH to send MBMS feedback to the network.
  a. The MBMS feedback information may be indicated by one of a RACH preamble, a MSGA and MSG3
  b. The MBMS feedback may include one or more of HARQ ACK/NACK to the PDSCH transmission and CQI report for PDSCH transmissions of at least the MBMS service.

Transmitting Side (e.g., BS):

If a cell is broadcasting an MBMS service, the BS may transmit SIB1, MBMS system information block (SIB), one or more MCCHs, and/or one or more MTCHs. Here, the MCCH and the MTCH, which are logical channels, may be transmitted on a physical channel, PDSCH, and may be scheduled on the PDCCH. The MCCH may carry MBMS control information, and one MTCH may carry specific MBMS service data.

The BS may provide a BWP (e.g., MBMS BWP) for MBMS to UEs. The MBMS BWP may include at least one of an MBMS SIB DL BWP and MBMS SIB UL BWP for MBMS SIB transmission and reception, an MCCH DL BWP and MCCH UL BWP for MCCH transmission and reception, and an MTCH DL BWP and/or MTCH UL BWP for MTCH transmission and reception. That is, one cell may provide zero or one or more MBMS DL BWPs and zero or one or more MBMS UL BWPs. Accordingly, a BS supporting MBMS may provide all the above MBMS BWP types separately from the conventional initial BWP or UE-dedicated BWP, or may provide only zero or some MBMS BWP(s). Some or all MBMS BWPs may be the same as or different from the conventional initial BWP, a default BWP, a first active BWP, or an active BWP.

The UE may configure SC-RNTI and MCCH transmission according to MBMS SIB or MBMS control information provided by the BS. Here, the MBMS SIB or MBMS control information may include information for configuring a DL BWP and UL BWP for the MBMS.

The MBMS SIB or MBMS control information may include at least part of the following information.

PUCCH Resource Set(s) for MBMS-Related Feedback
  a. A common PUCCH resource mapped to a specific service ID (e.g., TMGI), a specific G-RNTI, a specific MBMS DL BWP, specific MTCH channel(s), or specific MCCH channel(s), or a UE-dedicated PUCCH resource (set) used by an individual UE receiving a specific service or a specific G-RNTI transmission may be configured/provided.

RACH Resource for MBMS-Related Feedback
  a. RACH resource information mapped to a specific service ID (TMGI), a specific G-RNTI, a specific MBMS DL BWP, specific MTCH channel(s), or specific MCCH channel(s) may be provided. For example, a specific RACH preamble, a preamble occasion, or a RACH occasion may be mapped to/associated with at least one of the specific service ID (e.g., TMGI), specific G-RNTI, specific MBMS DL BWP, specific MTCH channel(s), or specific MCCH channel(s).

Figure 8:
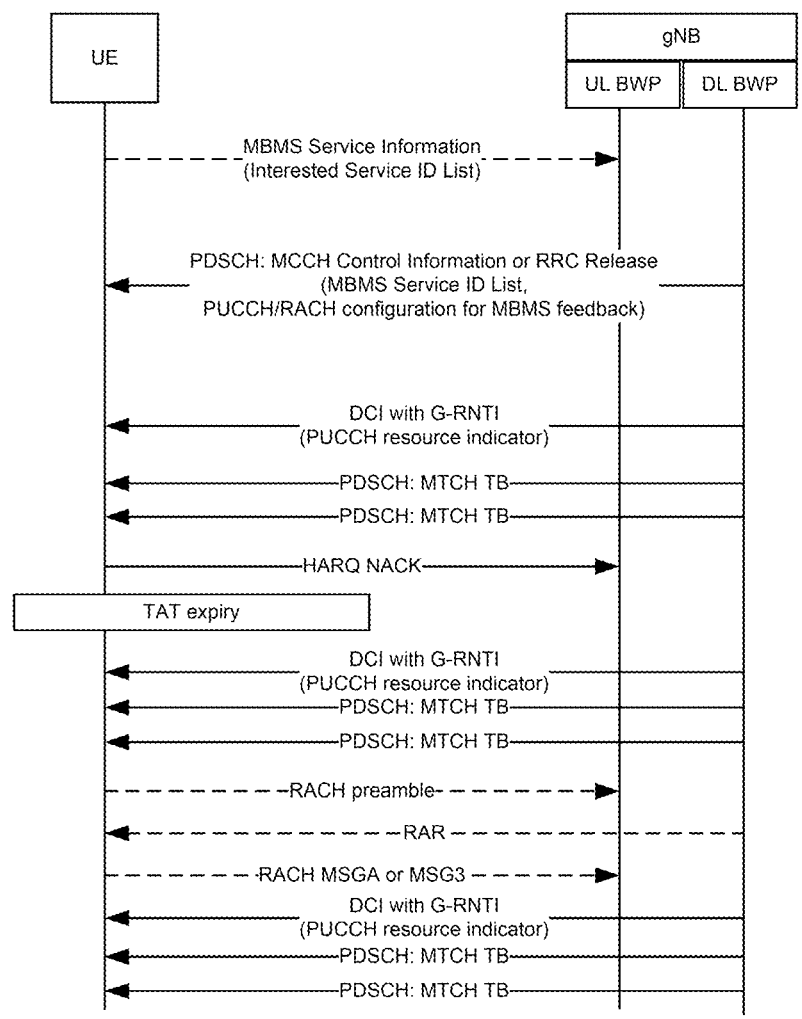
FIG. 8 illustrates an MBMS-related feedback scheme according to an embodiment of the present disclosure.

In FIG. 8, the BS may provide MBMS transmission on a UL BWP and DL BWP. For example, MCCH control information and MTCH transmission may be provided on the DL BWP. Also, feedback related to PDSCH transmission for the MCCH or feedback related to PDSCH transmission for the MTCH may be provided on the UL BWP. For example, the UL BWP may be used for reporting of HARQ ACK/NACK or an MBMS-related SSB/CSI-RS measurement result as an MBMS-related feedback.

The BS may configure one or more PUCCH resource sets for MBMS-related feedback. Also, the BS may provide specific RACH preambles and specific RACH resources for the MBMS-related feedback.

Receiving Side (e.g., UE):

Hereinafter, the UE operation will be described. FIG. 8 illustrates an MBMS-related feedback according to the present disclosure.

The UE may configure at least one DL BWP and one UL BWP for MBMS reception. The UE may receive MBMS control information or MTCH TB on the DL BWP. The UE may transmit MBMS-related feedback for the control information or MTCH TB on the UL BWP connected to/associated with the DL BWP.

The BS may configure one or more PUCCH resource sets on the UL BWP for the UE. This configuration may be delivered to the idle/inactive/connected UE through system information, MBMS control information, and/or a UE-dedicated message. As shown in FIG. 8, when the BS switches the connected UE receiving the MBMS to the idle/inactive mode, the RRC Release message transmitted by the BS to the UE may include PUCCH resource set configuration information. The RRC Release message may also include RACH configuration information for MBMS-related feedback, which will be described later.

In one example of the present disclosure, one PUCCH resource set may be mapped to/associated with at least part of one or more G-RNTIs, one or more DL BWPs, one or more UL BWPs, one or more MCCHs, one or more MTCHs, or one or more MBMS service IDs (e.g., TMGIs). In this case, the PUCCH resource may be shared by/common to all UEs receiving the MBMS transmission. In this case, all idle/inactive/connected UEs may send a report through the PUCCH resource. A connected UE may be allocated a UE-specific PUCCH resource separately. In this case, the UE may report an MBMS-related feedback through a UE-dedicated PUCCH resource.

When a UL PUCCH resource is configured and a PDCCH/PDSCH for the mapped MCCH TB or MTCH TB is received, the UE may activate the corresponding UL BWP to transmit MBMS-related feedback through a PUCCH resource connected to the TB. Alternatively, if a PDCCH for the MCCH TB or MTCH TB includes a PUCCH resource indicator, the UE may activate the UL BWP to transmit MBMS-related feedback through a PUCCH resource according to the PUCCH resource indicator.

The PUCCH resource for the MCCH TB or MTCH TB may be valid according to a mapping indication from the BS:

The resource is mapped to the MCCH or MTCH;
G-RNTI for TB transmission is mapped to the resource;
The MBMS service ID (TMGI) for the TB is mapped to the resource;
The DL BWP in which the TB is transmitted is mapped to the resource; and
The UL BWP in which MBMS-related feedback for the TB is transmitted is mapped to the resource.

In FIG. 8, the UE may receive DCI and MTCH TB. The CRC of the DCI may be scrambled with a G-RNTI mapped to a received service. Specifically, the BS may map/associate one or more MBMS service IDs to/with a specific MBMS search space set (hereinafter referred to as MSS set). In one example of the present disclosure, the MSS may be defined as a new type of CSS, a USS, or a new search space other than the CSS/USS.

The UE may activate the DL BWP in which the MBMS service to be received is transmitted, and monitor the PDCCH through a specific MSS set mapped to the MBMS service. The UE may monitor the PDCCH through the MSS and receive DCI with which the CRC is scrambled using the G-RNTI mapped to the service. The UE may receive MBMS service data (e.g., the MTCH TB of MCCH TB in FIG. 8) by receiving the PDSCH transmission indicated by the DCI.

Here, the PDSCH carrying the MTCH TB (or MCCH TB) may be a bundled transmission including two or more PDSCH transmissions. The UE may transmit HARQ feedback after transmission is performed as many times as the number of transmissions in one bundle. The HARQ feedback may be transmitted through uplink control information (UCI) or a MAC control element (MAC CE).

The UE may transmit HARQ-ACK through the UCI when the PUCCH is valid. In the case of PUCCH transmission, the UCI may be transmitted on a PUCCH resource mapped to the corresponding TB transmission. In this case, the UCI may report ACK or NACK.

If there is no valid PUCCH resource for the MCCH TB or MTCH TB, there is no UE-dedicated PUCCH resource, or the time adjustment timer (TAT) driven by the UE to maintain the UL timing is not running or has expired, the UE may trigger the RACH to transmit the MAC CE.

In FIG. 8, the UE may request retransmission of the MTCH TB by reporting NACK as HARQ-ACK information. In this case, it may be difficult to report MBMS-related feedback due to expiration of the TAT or release of the valid resource. Accordingly, in this case, if the MTCH TB retransmission is received and the HARQ feedback is reported, the UE may trigger the RACH to transmit the MBMS-related feedback MAC CE. Here, the MBMS-related feedback MAC CE may include a service ID field indicating the TMGI or G-RNTI of the TB and an ACK/NACK indicator field. The MBMS-related feedback MAC CE may be identified through a specific LCID of the UL MAC PDU header.

When the MBMS-related feedback is transmitted on the RACH, a specific RACH preamble ID may be mapped as follows:

The RACH preamble ID may be mapped to the corresponding MCCH or MTCH channel;
A G-RNTI for TB transmission may be mapped to the RACH preamble ID;
MBMS service ID (TMGI) for TB may be mapped to the RACH preamble ID;
A DL BWP through which a TB is transmitted may be mapped to the RACH preamble ID; or
A UL BWP through which MBMS-related feedback for the TB is transmitted may be mapped to the RACH preamble ID.

When the mapped RACH preamble ID is present, the UE may perform contention-free RACH transmission according to the mapped RACH preamble ID. Accordingly, after the RACH preamble is transmitted and a random access response (RAR) or a PDCCH is received, the RACH procedure may be terminated.

When the mapped RACH preamble ID is not present in a 4-Step RACH, the UE may randomly select a RACH preamble ID and perform contention-based RACH transmission. Accordingly, when the RAR is received after transmitting the RACH preamble, MSG3 may be transmitted and the RACH procedure may be terminated.

When the mapped RACH preamble ID is not present in a 2-step RACH, the UE may randomly select a RACH preamble ID and transmit the selected RACH preamble ID and MSGA. After the transmission, an MSGB may be received and the RACH procedure may be terminated.

For the RACH transmission, the UE may determine a RACH preamble occasion (PO) and/or a RACH occasion (RO) for MSG3/MSGA PUSCH transmission based on at least part of the following mapping:

- Mapping the corresponding MCCH or MTCH to a specific PO/RO;
- Mapping a G-RNTI for TB transmission is mapped to a specific PO/RO;
- Mapping an MBMS service ID (TMGI) for a TB to a specific PO/RO;
- Mapping a DL BWP through which the TB is transmitted to a specific PO/RO; and
- Mapping a UL BWP through which MBMS-related feedback for the TB is transmitted to a specific PO/RO.

The UE may change the beam/TRP/TCI state for MBMS reception through the RACH procedure. In this case, the UE may monitor the PDCCH occasion using the CORSET/MSS set mapped to the changed beam/TRP/TCI state. The UE may receive DCI having CRC scrambled with G-RNTI on the PDCCH.

When the MTCH TB is successfully received or when the MTCH TB corresponds to the last transmission, the UE may transmit a HARQ ACK for the last MTCH TB or skip HARQ ACK transmission. In the case where the UE skips the transmission, the UE may not trigger the RACH.

Figure 9:
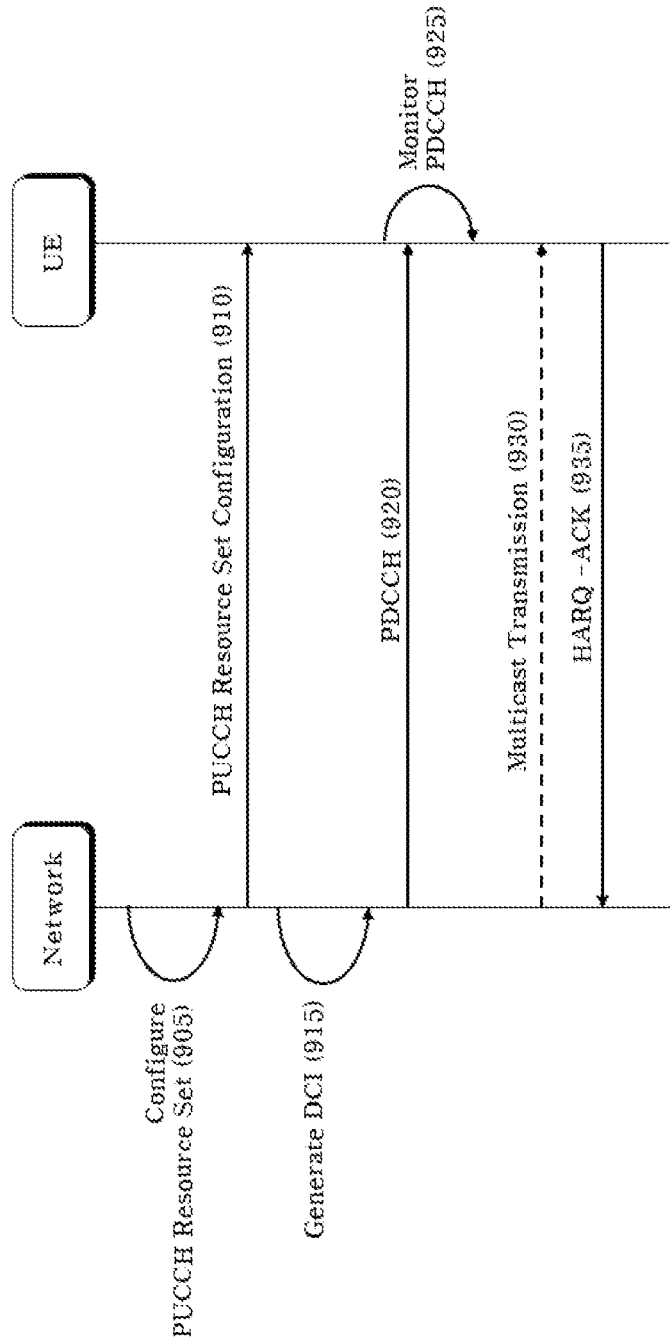
FIG. 9 illustrates a signal transmission/reception method according to an embodiment of the present disclosure.

FIG. 9 illustrates a signal transmission/reception method according to an embodiment of the present disclosure.

Referring to FIG. 9, a BS may configure at least one physical uplink control channel (PUCCH) resource set associated with at least one downlink multicast channel (operation 905).

A UE may acquire a configuration for the at least one PUCCH resource set associated with the at least one downlink multicast channel (operation 910).

The BS may generate downlink control information (DCI) having a cyclic redundancy check (CRC) scrambled with a specific group-radio network temporary identifier (G-RNTI) (operation 915).

The BS may transmit a physical downlink control channel (PDCCH) carrying the DCI in a search space for scheduling of a specific downlink multicast channel among the at least one downlink multicast channel (operation 920).

The UE may monitor the PDCCH in the search space for scheduling of the specific downlink multicast channel among the at least one downlink multicast channel (operation 925). As a result of monitoring of the PDCCH, the UE may detect the DCI having the CRC scrambled with the specific G-RNTI.

The UE may attempt to receive the specific downlink multicast channel based on the DCI (operation 930).

The UE may transmit a hybrid automatic repeat request (HARQ)-acknowledgement (ACK) for the specific downlink multicast channel (operation 935).

A specific PUCCH resource set associated with the specific downlink multicast channel may be mapped to a specific downlink frequency band in which a search space in which PDCCH monitoring is performed is positioned. Among one or more PUCCH resources included in the specific PUCCH resource set, a PUCCH resource for transmission of the HARQ-ACK for the specific downlink multicast channel may be indicated through the DCI.

The PUCCH resource for transmission of the HARQ-ACK may be indicated through a PUCCH resource indicator included in the DCI.

The at least one PUCCH resource set associated with the at least one downlink multicast channel may be configured separately from a PUCCH resource set associated with a downlink unicast channel.

The specific PUCCH resource set may be mapped to one or more G-RNTIs including a specific G-RNTI.

When a timer for uplink timing of the UE expires, transmitting the HARQ-ACK through a determined PUCCH resource may not be allowed.

The UE may transmit the HARQ-ACK through the determined PUCCH resource on a basis that the timer for the uplink timing has not expired.

The specific downlink frequency band may be related to an active BWP of the UE.

The specific downlink frequency band may correspond to a UE-common frequency resource.

The specific downlink multicast channel may be a multicast traffic channel carrying multicast data.

The various descriptions, functions, procedures, proposals, methods, and/or operation flowcharts of the present disclosure described herein may be applied to, but not limited to, various fields requiring wireless communication/connectivity (e.g., 5G) between devices.

More specific examples will be described below with reference to the drawings. In the following drawings/description, like reference numerals denote the same or corresponding hardware blocks, software blocks, or function blocks, unless otherwise specified.

Figure 10:
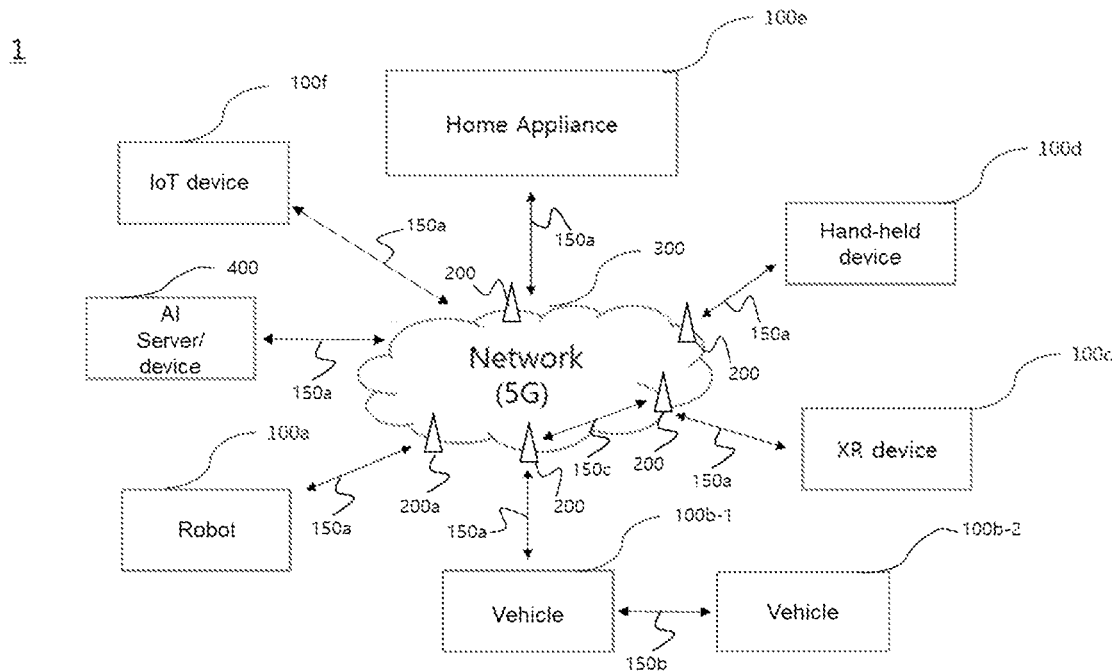
FIGS. 10 to 13 illustrate a communication system 1 and wireless devices applied to the present disclosure.

FIG. 10 illustrates a communication system 1 applied to the present disclosure.

Referring to FIG. 10, a communication system 1 applied to the present disclosure includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 11:
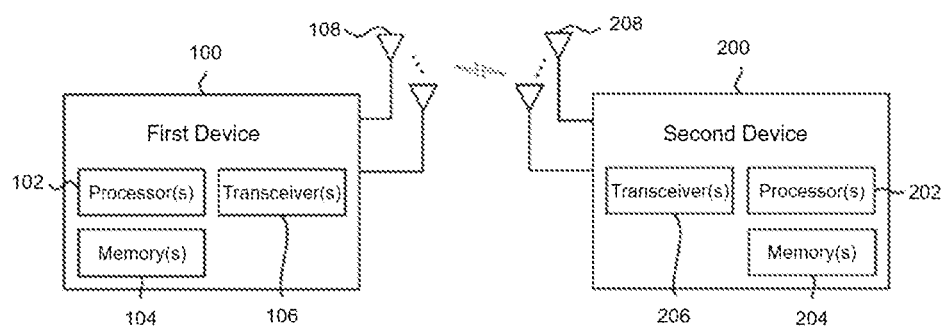

FIG. 11 illustrates wireless devices applicable to the present disclosure.

Referring to FIG. 11, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 10.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection. The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 12:
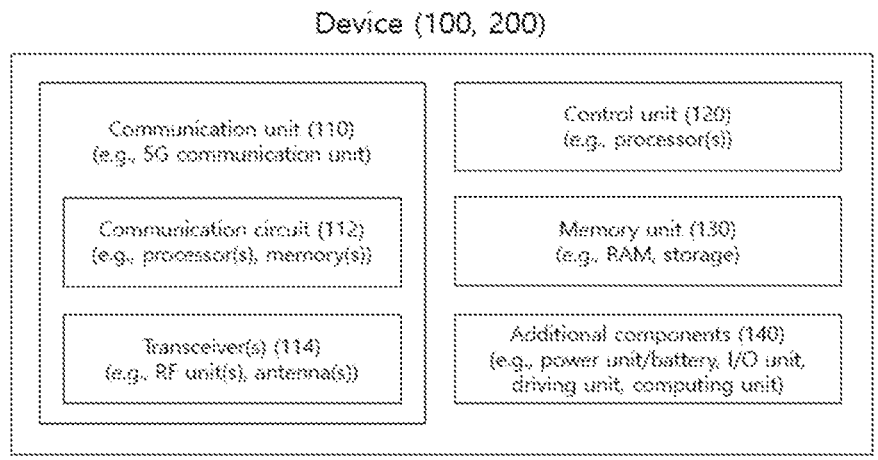

FIG. 12 illustrates another example of a wireless device applied to the present disclosure. The wireless device may be implemented in various forms according to a use-case/service (refer to FIG. 12).

Referring to FIG. 12, wireless devices 100 and 200 may correspond to the wireless devices 100 and 200 of FIG. 11 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 11. For example, the transceiver(s) 114 may include the one or more transceivers 106 and 206 and/or the one or more antennas 108 and 208 of FIG. 11. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 10), the vehicles (100b-1 and 100b-2 of FIG. 10), the XR device (100c of FIG. 10), the hand-held device (100d of FIG. 10), the home appliance (100e of FIG. 10), the IoT device (100f of FIG. 10), a digital broadcast terminal, a hologram device, a public safety device, an MTC device, a medicine device, a fintech device (or a finance device), a security device, a climate/environment device, the AI server/device (400 of FIG. 10), the BSs (200 of FIG. 10), a network node, etc. The wireless device may be used in a mobile or fixed place according to a use-example/service.

In FIG. 12, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Figure 13:
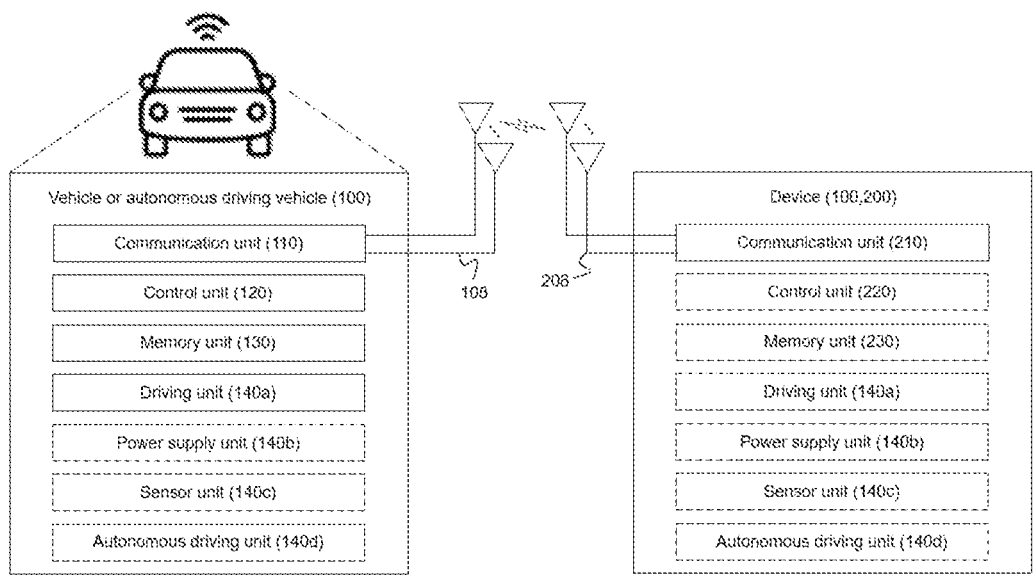

FIG. 13 illustrates a vehicle or an autonomous driving vehicle applied to the present disclosure. The vehicle or autonomous driving vehicle may be implemented by a mobile robot, a car, a train, a manned/unmanned Aerial Vehicle (AV), a ship, etc.

Referring to FIG. 13, a vehicle or autonomous driving vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 12, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an Electronic Control Unit (ECU). The driving unit 140a may cause the vehicle or the autonomous driving vehicle 100 to drive on a road. The driving unit 140a may include an engine, a motor, a powertrain, a wheel, a brake, a steering device, etc. The power supply unit 140b may supply power to the vehicle or the autonomous driving vehicle 100 and include a wired/wireless charging circuit, a battery, etc. The sensor unit 140c may acquire a vehicle state, ambient environment information, user information, etc. The sensor unit 140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the obtained data. The control unit 120 may control the driving unit 140a such that the vehicle or the autonomous driving vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous driving vehicles and provide the predicted traffic information data to the vehicles or the autonomous driving vehicles.

Figure 14:
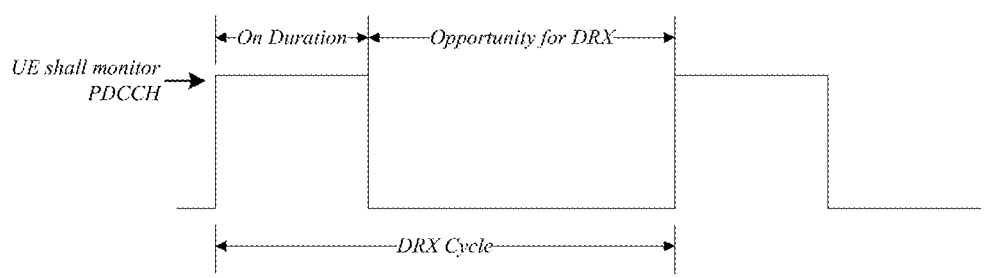
FIG. 14 illustrates an exemplary discontinuous reception (DRX) operation applied to the present disclosure.

FIG. 14 is a diagram illustrating a DRX operation of a UE according to an embodiment of the present disclosure.

The UE may perform a DRX operation in the afore-described/proposed procedures and/or methods. A UE configured with DRX may reduce power consumption by receiving a DL signal discontinuously. DRX may be performed in an RRC_IDLE state, an RRC_INACTIVE state, and an RRC_CONNECTED state. The UE performs DRX to receive a paging signal discontinuously in the RRC_IDLE state and the RRC_INACTIVE state. DRX in the RRC_CONNECTED state (RRC_CONNECTED_DRX) will be described below.

Referring to FIG. 14, a DRX cycle includes an On Duration and an Opportunity for DRX. The DRX cycle defines a time interval between periodic repetitions of the On Duration. The On Duration is a time period during which the UE monitors a PDCCH. When the UE is configured with DRX, the UE performs PDCCH monitoring during the On Duration. When the UE successfully detects a PDCCH during the PDCCH monitoring, the UE starts an inactivity timer and is kept awake. On the contrary, when the UE fails in detecting any PDCCH during the PDCCH monitoring, the UE transitions to a sleep state after the On Duration. Accordingly, when DRX is configured, PDCCH monitoring/reception may be performed discontinuously in the time domain in the afore-described/proposed procedures and/or methods. For example, when DRX is configured, PDCCH reception occasions (e.g., slots with PDCCH SSs) may be configured discontinuously according to a DRX configuration in the present disclosure. On the contrary, when DRX is not configured, PDCCH monitoring/reception may be performed continuously in the time domain. For example, when DRX is not configured, PDCCH reception occasions (e.g., slots with PDCCH SSs) may be configured continuously in the present disclosure. Irrespective of whether DRX is configured, PDCCH monitoring may be restricted during a time period configured as a measurement gap.

Table 5 describes a DRX operation of a UE (in the RRC_CONNECTED state). Referring to Table 5, DRX configuration information is received by higher-layer signaling (e.g., RRC signaling), and DRX ON/OFF is controlled by a DRX command from the MAC layer. Once DRX is configured, the UE may perform PDCCH monitoring discontinuously in performing the afore-described/proposed procedures and/or methods, as illustrated in FIG. 5.

TABLE 5

| | Type of signals | UE procedure |
|---|---|---|
| 1st Step | RRC signalling(MAC-CellGroupConfig) | Receive DRX configuration information |
| 2nd Step | MAC CE((Long) DRX command MAC CE) | Receive DRX command |
| 3rd Step | — | Monitor a PDCCH during an on-duration of a DRX cycle |

MAC-CellGroupConfig includes configuration information required to configure MAC parameters for a cell group. MAC-CellGroupConfig may also include DRX configuration information. For example, MAC-CellGroupConfig may include the following information in defining DRX.

Value of drx-OnDurationTimer: defines the duration of the starting period of the DRX cycle.

Value of drx-InactivityTimer: defines the duration of a time period during which the UE is awake after a PDCCH occasion in which a PDCCH indicating initial UL or DL data has been detected Value of drx-HARQ-RTT-TimerDL: defines the duration of a maximum time period until a DL retransmission is received after reception of a DL initial transmission.

Value of drx-HARQ-RTT-TimerDL: defines the duration of a maximum time period until a grant for a UL retransmission is received after reception of a grant for a UL initial transmission.

drx-LongCycleStartOffset: defines the duration and starting time of a DRX cycle.

drx-ShortCycle (optional): defines the duration of a short DRX cycle.

When any of drx-OnDurationTimer, drx-InactivityTimer, drx-HARQ-RTT-TimerDL, and drx-HARQ-RTT-TimerDL is running, the UE performs PDCCH monitoring in each PDCCH occasion, staying in the awake state.

The embodiments of the present disclosure described above are combinations of elements and features of the present disclosure. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present disclosure or included as a new claim by a subsequent amendment after the application is filed.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

The present disclosure is applicable to UEs, BSs, or other apparatuses in a wireless mobile communication system.

What is claimed is:

1. A method for receiving a signal by a terminal in a wireless communication system, the method comprising:
receiving, from a base station (BS), a primary synchronization signal (PSS), a secondary synchronization signal (SSS), and a physical broadcast channel (PBCH);
performing synchronization with the BS based on the PSS and the SSS;
obtaining system information based on the PBCH;
acquiring a configuration for at least one physical uplink control channel (PUCCH) resource set associated with at least one downlink multicast channel;
monitoring a physical downlink control channel (PDCCH) in a search space for scheduling of a specific downlink multicast channel among the at least one downlink multicast channel; and
detecting, as a result of the monitoring of the PDCCH, downlink control information (DCI) having a cyclic redundancy check (CRC) scrambled with a specific group-radio network temporary identifier (G-RNTI),
wherein a specific PUCCH resource set associated with the specific downlink multicast channel is mapped to a specific downlink frequency band having the search space for the monitoring of the PDCCH,
wherein a PUCCH resource for transmission of hybrid automatic repeat request (HARQ)-acknowledgement (ACK) for the specific downlink multicast channel among one or more PUCCH resources included in the specific PUCCH resource set is indicated through the DCI,
wherein the at least one PUCCH resource set includes a first PUCCH resource set associated with the specific downlink multicast channel received in an RRC idle/inactive mode and a second PUCCH resource set associated with the specific downlink multicast channel received in an RRC connected mode, and
wherein the specific PUCCH resource set indicated through the DCI is determined in the first PUCCH resource set or the second PUCCH resource set based on whether a user equipment (UE) is in the RRC idle/inactive mode or the RRC connected mode.

2. The method of claim 1, wherein the PUCCH resource for the transmission of the HARQ-ACK is indicated through a PUCCH resource indicator included in the DCI.

3. The method of claim 1, wherein the at least one PUCCH resource set associated with the at least one downlink multicast channel is configured separately from a PUCCH resource set associated with a downlink unicast channel.

4. The method of claim 1, wherein the specific PUCCH resource set is mapped to one or more G-RNTIs including the specific G-RNTI.

5. The method of claim 1, wherein transmitting the HARQ-ACK through the determined PUCCH resource is not allowed when a timer for uplink timing of the terminal expires.

6. The method of claim 1, further comprising:
transmitting the HARQ-ACK through the determined PUCCH resource on a basis that a timer for the uplink timing of the terminal has not expired.

7. The method of claim 1, wherein the specific downlink frequency band is related to an active bandwidth part (BWP) of the terminal.

8. The method of claim 1, wherein the specific downlink frequency band corresponds to a terminal-common frequency resource.

9. The method of claim 1, wherein the specific downlink multicast channel is a multicast traffic channel carrying multicast data.

10. A non-transitory computer-readable recording medium having a program recorded thereon for executing the method of claim 1.

11. A terminal for receiving a signal in a wireless communication system, comprising:
a transceiver; and
a processor configured to control the transceiver to perform operations, the operations comprising:
receiving, from a base station (BS), a primary synchronization signal (PSS), a secondary synchronization signal (SSS), and a physical broadcast channel (PBCH);
performing synchronization with the BS based on the PSS and the SSS;
obtaining system information based on the PBCH;
acquiring a configuration for at least one physical uplink control channel (PUCCH) resource set associated with at least one downlink multicast channel;
monitoring a physical downlink control channel (PDCCH) in a search space for scheduling of a specific downlink multicast channel among the at least one downlink multicast channel; and
detecting, as a result of the monitoring of the PDCCH, downlink control information (DCI) having a cyclic redundancy check (CRC) scrambled with a specific group-radio network temporary identifier (G-RNTI),
wherein a specific PUCCH resource set associated with the specific downlink multicast channel is mapped to a specific downlink frequency band having the search space for the monitoring of the PDCCH,
wherein a PUCCH resource for transmission of hybrid automatic repeat request (HARQ)-acknowledgement (ACK) for the specific downlink multicast channel among one or more PUCCH resources included in the specific PUCCH resource set is indicated through the DCI,
wherein the at least one PUCCH resource set includes a first PUCCH resource set associated with the specific downlink multicast channel received in an RRC idle/inactive mode and a second PUCCH resource set associated with the specific downlink multicast channel received in an RRC connected mode, and
wherein the specific PUCCH resource set indicated through the DCI is determined in the first PUCCH resource set or the second PUCCH resource set based on whether a user equipment (UE) is in the RRC idle/inactive mode or the RRC connected mode.

12. A device for controlling a terminal in a wireless communication system, comprising:
a memory configured to store instructions; and
a processor configured to execute the instructions to perform operations,
wherein the operations comprise:
receiving, from a base station (BS), a primary synchronization signal (PSS), a secondary synchronization signal (SSS), and a physical broadcast channel (PBCH);
performing synchronization with the BS based on the PSS and the SSS;
obtaining system information based on the PBCH;
acquiring a configuration for at least one physical uplink control channel (PUCCH) resource set associated with at least one downlink multicast channel;
monitoring a physical downlink control channel (PDCCH) in a search space for scheduling of a specific downlink multicast channel among the at least one downlink multicast channel; and
detecting, as a result of the monitoring of the PDCCH, downlink control information (DCI) having a cyclic redundancy check (CRC) scrambled with a specific group-radio network temporary identifier (G-RNTI),
wherein a specific PUCCH resource set associated with the specific downlink multicast channel is mapped to a specific downlink frequency band having the search space for the monitoring of the PDCCH,
wherein a PUCCH resource for transmission of hybrid automatic repeat request (HARQ)-acknowledgement (ACK) for the specific downlink multicast channel among one or more PUCCH resources included in the specific PUCCH resource set is indicated through the DCI,
wherein the at least one PUCCH resource set includes a first PUCCH resource set associated with the specific downlink multicast channel received in an RRC idle/inactive mode and a second PUCCH resource set associated with the specific downlink multicast channel received in an RRC connected mode, and
wherein the specific PUCCH resource set indicated through the DCI is determined in the first PUCCH resource set or the second PUCCH resource set based on whether a user equipment (UE) is in the RRC idle/inactive mode or the RRC connected mode.

13. A method for transmitting a signal by a base station in a wireless communication system, the method comprising:
transmitting, to a user equipment (UE), a primary synchronization signal (PSS), a secondary synchronization signal (SSS), and a physical broadcast channel (PBCH);
performing synchronization with the UE based on the PSS and the SSS;
configuring at least one physical uplink control channel (PUCCH) resource set associated with at least one downlink multicast channel;
generating downlink control information (DCI) having a cyclic redundancy check (CRC) scrambled with a specific group-radio network temporary identifier (G-RNTI); and
transmitting a physical downlink control channel (PDCCH) carrying the DCI in a search space for scheduling of a specific downlink multicast channel among the at least one downlink multicast channel,
wherein a specific PUCCH resource set associated with the specific downlink multicast channel is mapped to a specific downlink frequency band having the search space for the transmitting of the PDCCH,
wherein a PUCCH resource for reception of hybrid automatic repeat request (HARQ)-acknowledgement (ACK) for the specific downlink multicast channel among one or more PUCCH resources included in the specific PUCCH resource set is indicated through the DCI,
wherein the at least one PUCCH resource set includes a first PUCCH resource set associated with the specific downlink multicast channel received in an RRC idle/inactive mode and a second PUCCH resource set associated with the specific downlink multicast channel received in an RRC connected mode, and
wherein the specific PUCCH resource set indicated through the DCI is determined in the first PUCCH resource set or the second PUCCH resource set based on whether the UE is in the RRC idle/inactive mode or the RRC connected mode.

14. A base station for transmitting a signal in a wireless communication system, comprising:
   a transceiver; and
   a processor configured to perform operations, the operations comprising:
   transmitting, to a user equipment (UE), a primary synchronization signal (PSS), a secondary synchronization signal (SSS), and a physical broadcast channel (PBCH);
   performing synchronization with the UE based on the PSS and the SSS;
   configuring at least one physical uplink control channel (PUCCH) resource set associated with at least one downlink multicast channel;
   generating downlink control information (DCI) having a cyclic redundancy check (CRC) scrambled with a specific group-radio network temporary identifier (G-RNTI); and
   transmitting, through the transceiver, a physical downlink control channel (PDCCH) carrying the DCI in a search space for scheduling of a specific downlink multicast channel among the at least one downlink multicast channel,
   wherein a specific PUCCH resource set associated with the specific downlink multicast channel is mapped to a specific downlink frequency band having the search space for the transmitting of the PDCCH,
   wherein a PUCCH resource for reception of hybrid automatic repeat request (HARQ)-acknowledgement (ACK) for the specific downlink multicast channel among one or more PUCCH resources included in the specific PUCCH resource set is indicated through the DCI,
   wherein the at least one PUCCH resource set includes a first PUCCH resource set associated with the specific downlink multicast channel received in an RRC idle/inactive mode and a second PUCCH resource set associated with the specific downlink multicast channel received in an RRC connected mode, and
   wherein the specific PUCCH resource set indicated through the DCI is determined in the first PUCCH resource set or the second PUCCH resource set based on whether the UE is in the RRC idle/inactive mode or the RRC connected mode.

* * * * *